(12) United States Patent
Coates et al.

(10) Patent No.: US 6,349,570 B1
(45) Date of Patent: Feb. 26, 2002

(54) IN-BARREL WETTING SCREW CHARGER

(75) Inventors: Stephen Coates, Galena, IL (US); Jake Ross, Houston, PA (US); Anthony Sushel, Claysville, PA (US); Joseph Sewchok, West Alexander, PA (US); Fred Lindeman, Dubuque, IA (US)

(73) Assignee: Merkle Engineers, Inc., Galena, IL (US)

( * ) Notice: Subject to any disclaimer, the term of this patent is extended or adjusted under 35 U.S.C. 154(b) by 0 days.

(21) Appl. No.: 09/541,205

(22) Filed: Apr. 3, 2000

Related U.S. Application Data

(63) Continuation-in-part of application No. 09/291,728, filed on Apr. 14, 1999, now abandoned.

(51) Int. Cl.$^7$ .................................................. C03B 3/00
(52) U.S. Cl. ................... 65/135.9; 65/136.1; 65/136.3; 65/335; 65/347; 366/167.1; 366/168.1; 366/266; 366/318; 366/324; 366/319
(58) Field of Search ................ 65/135.9, 136.1, 65/136.3, 17.2, 21.1, 21.5, 335, 347; 366/167.1, 168.1, 266, 318, 324, 319

(56) References Cited

U.S. PATENT DOCUMENTS

| | | |
|---|---|---|
| 30,682 A | 11/1860 | Kase |
| 897,495 A | 9/1908 | Schulthess |
| 3,130,070 A | 4/1964 | Potters et al. |
| 3,725,022 A | 4/1973 | Mills |
| 3,765,854 A | 10/1973 | Kozlowski |
| 3,823,920 A | 7/1974 | Mills et al. |
| 3,955,956 A | 5/1976 | Terner |
| 3,964,732 A | 6/1976 | Hartley |
| 3,968,903 A | 7/1976 | Rosentreter et al. |
| 4,172,712 A | 10/1979 | Heller |
| 4,187,030 A | 2/1980 | Godley |
| 4,483,625 A | 11/1984 | Fisher |
| 4,513,688 A | 4/1985 | Fassauer |
| 4,653,977 A | 3/1987 | Fries |

FOREIGN PATENT DOCUMENTS

| | | |
|---|---|---|
| EP | 0 046 569 | 3/1982 |
| EP | 0 357 919 A | 3/1990 |
| WO | WO 83/ 01910 | 6/1983 |

*Primary Examiner*—Michael Colaianni
(74) *Attorney, Agent, or Firm*—Pauley Petersen Kinne & Fejer

(57) ABSTRACT

A wet batch material charging apparatus having a charger screw housing having a batch material inlet and a batch material outlet, a dry batch material supply device adapted to deliver a dry batch material through the batch material inlet, a rotatable charger screw shaft having at least one screw flight disposed within the charger screw housing and adapted to convey the batch material from the batch material inlet to the batch material outlet, and a liquid supply apparatus for introducing at least one liquid into the charger screw housing. The liquid supply apparatus independently controls the liquid flow rate and the liquid flow duration based upon the batch material charging speed and rotation of the rotatable charger screw shaft.

13 Claims, 5 Drawing Sheets

IN-BARREL WETTING SCREW CHARGER

CROSS-REFERENCE TO RELATED APPLICATION

This application is a continuation-in-part application of U.S. patent application Ser. No. 09/291,728 having a filing date of Apr. 14, 1999 now abandoned.

BACKGROUND OF THE INVENTION

1. Field of the Invention

This invention relates to a screw charger for charging wet batch material into a high temperature material processing furnace, in particular, a glass melting furnace.

2. Description of Prior Art

For certain manufacturing applications involving the processing of particulate batch materials, introduction of moisture to the dry batch materials is advantageous and, in some cases, even necessary, in order to prevent high-velocity furnace gases from picking up the particulate and depositing it on the furnace superstructure or within heat exchange media of the regenerator. Such deposits can cause, respectively, deterioration of the superstructure, and, through plugging of the heat exchange media, loss of efficiency in the furnace. In addition, melting of the batch is affected negatively by separation of the batch components. Numerous devices are known for mixing a dry particulate material with a liquid, such as water, and transporting the wet mixture to a desired location. For example, U.S. Pat. No. 897,495 teaches an apparatus for the production of hydrate of lime comprising a cylindrical slaking receptacle, a charging hopper, and a shaft having mixing and transporting blades, or paddles, for conveyance of a pasty hydrate of lime from the hopper end of the cylindrical slaking receptacle through the cylindrical slaking receptacle and out through an outlet opening thereof. The use of paddles mounted at an oblique angle on a shaft disposed within an elongated tub for mixing molding sand is taught by U.S. Pat. No. 3,964,732 while U.S. Pat. No. 4,483,625 teaches a method and apparatus for increasing the capacity of paddle screw mixer conveyors upon creating a dam of mixed particulate matter and another substance at the outlet end of the mixture. In accordance with one embodiment, two counter rotating shafts of paddles are employed to increase mixing efficiency.

U.S. Pat. No. 4,172,712 teaches an apparatus for automatically wetting and mixing glass batch immediately prior to its introduction into a glass melting furnace. The apparatus includes a structural arrangement wherein the typical hopper of a glass furnace charger is enlarged to such an extent that it will accommodate a mixing arrangement. Mixing action within the hopper is achieved by means of two rotating shafts, each of which is equipped with a plurality of paddle members. The apparatus further includes a fluid delivery system for delivering water to the batch material.

It is particularly desirable that, in the case of some glass batches, moisture be added to the batch at a point as close as possible to the point at which the batch is deposited into the glass melting furnace. Addition of the moisture at such a point is critical because certain batch constituents, upon addition of moisture, begin to harden, much as portland cement hardens after the addition of water.

Glass batch in its usual form is a mixture of finely divided solids which are thoroughly mixed and delivered to a refractory furnace by a system of hoppers, gravity flow chutes and other positive displacement conveyors. Because the batch is a finely divided material, severe dusting conditions are commonly encountered when the batch is exposed to high velocity hot gases such as those encountered in glass melting furnaces. In addition, the glass batch is extremely abrasive and will erode even the hardest of materials in a relatively short period of time where it frictionally contacts the moving parts of conventional positive displacement conveyance means such as screw conveyors, augers, and the like.

Numerous attempts have been made to reduce furnace dust conditions by wetting the glass batch prior to its delivery to the glass melting furnace. Such techniques, however, typically create additional problems, particularly as they relate to caking within the various conveyors and other transportation means which commonly form a part of the batch handling system. Process and apparatus improvements intended to alleviate this caking problem have included batch cooling and conveyor mixing. It will also be apparent to those skilled in the art that in those situations where batch temperature control is a requirement, the various controllers and heat transfer equipment will present economic considerations that make such improvements prohibitive. In addition, in those instances where the batch is being actively conveyed by the mixer apparatus, undue equipment wear is encountered due to the abrasive characteristics of the batch.

SUMMARY OF THE INVENTION

Accordingly, it is one object of this invention to provide a method and apparatus for effectively wetting glass batch material which avoids or overcomes the problems associated with batch wetting set forth hereinabove.

It is another object of this invention to provide an apparatus for wetting raw batch material and conveying the wetted raw batch material into a material processing furnace.

These and other objects of this invention are addressed by a wet batch material charging apparatus comprising a charger screw housing having a batch material inlet, a batch material outlet or discharge and a dry batch material supply means adapted to convey a dry batch material through the batch material inlet. Disposed within the charger screw housing is a rotatable charger screw shaft comprising at least one screw flight and adapted to convey the batch material from the batch material inlet to the batch material outlet. Wetting means are provided for introducing water or other liquid into the charger screw housing. The wetting means comprises flow control means for independently controlling a liquid flow rate and a liquid flow duration based upon the batch material charging speed and rotation of the rotatable charger screw shaft. In accordance with one embodiment, the wetting means comprises at least one liquid spray nozzle positioned to introduce the liquid into the charger screw housing, which liquid spray nozzle is operably connected to the flow control means, which, in turn, comprises means for enabling intermittent flow of the liquid through the liquid spray nozzle based upon rotation of the rotatable charger screw shaft.

In accordance with the method of this invention for charging wet batch material into a material processing furnace, dry batch material is introduced into the charger screw housing in which the charger screw shaft comprising at least one screw flight is rotating. A pulsing stream of a liquid, such as water, is introduced into the charger screw housing through a liquid spray nozzle immediately after the screw flight due to rotation of the rotatable charger screw shaft has passed by the liquid spray nozzle, that is, proximate the trailing edge of the screw flight. The resulting wet batch is then discharged from the charger screw housing into the material processing furnace.

At the trailing edge of the screw flight, there is a batch void or low density zone. The presence of this zone enables better liquid penetration into the batch material, thereby facilitating batch and liquid contact. This is important for wetting certain batch types, such as borosilicate glass batch, which has a tendency to set-up or harden relatively quickly upon wetting. However, the better penetration of liquid into the batch material resulting from the method of this invention enables placement of the liquid spray nozzles closer to the batch material discharge while still providing thorough mixing of the batch and liquid.

BRIEF DESCRIPTION OF THE DRAWINGS

These and other objects and features of this invention will be better understood from the following detailed description taken in conjunction with the drawings wherein.

DESCRIPTION OF PREFERRED EMBODIMENTS

Figure 1:
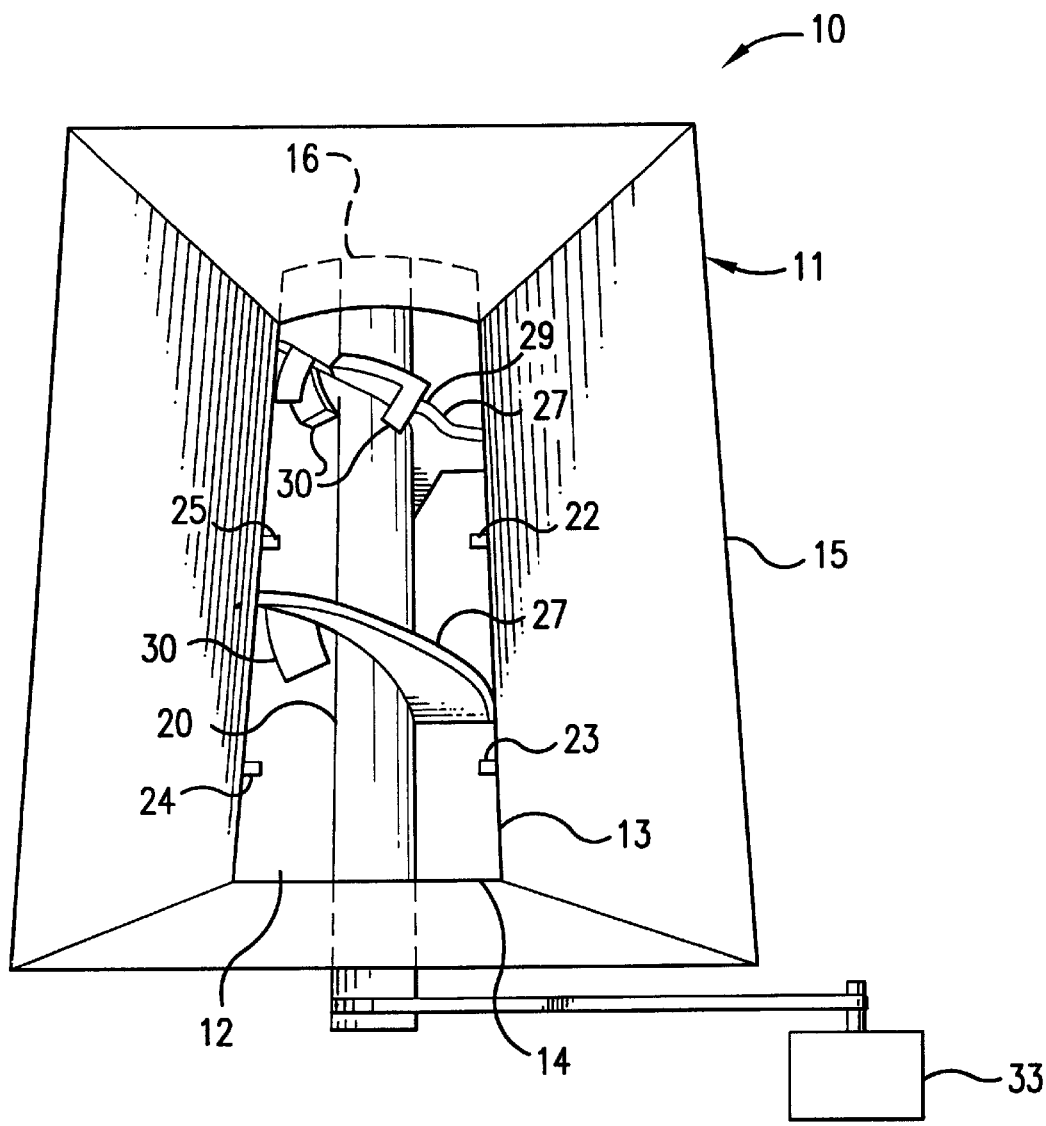
FIG. 1 is a partial perspective top view of an in-barrel wetting screw charger in accordance with one embodiment of this invention.

FIG. 1 shows an in-barrel wetting screw charger for mixing a liquid with a dry batch material and charging the wetted batch material into a material processing furnace in accordance with one embodiment of this invention. This apparatus is designed to fit proximate the raw batch material inlet to a material processing furnace, thereby affording the user the flexibility of adding varying amounts of moisture to the batch at a point as close as possible to the point at which the batch is charged into the furnace. As previously stated, addition of the moisture at this point, particularly with materials such as raw glass batch, is critical because certain of the batch constituents, upon addition of moisture, begin to harden. The in-barrel wetting screw charger and method of this invention provides complete mixing of the liquid with the dry batch material within this very short distance.

Figure 2:
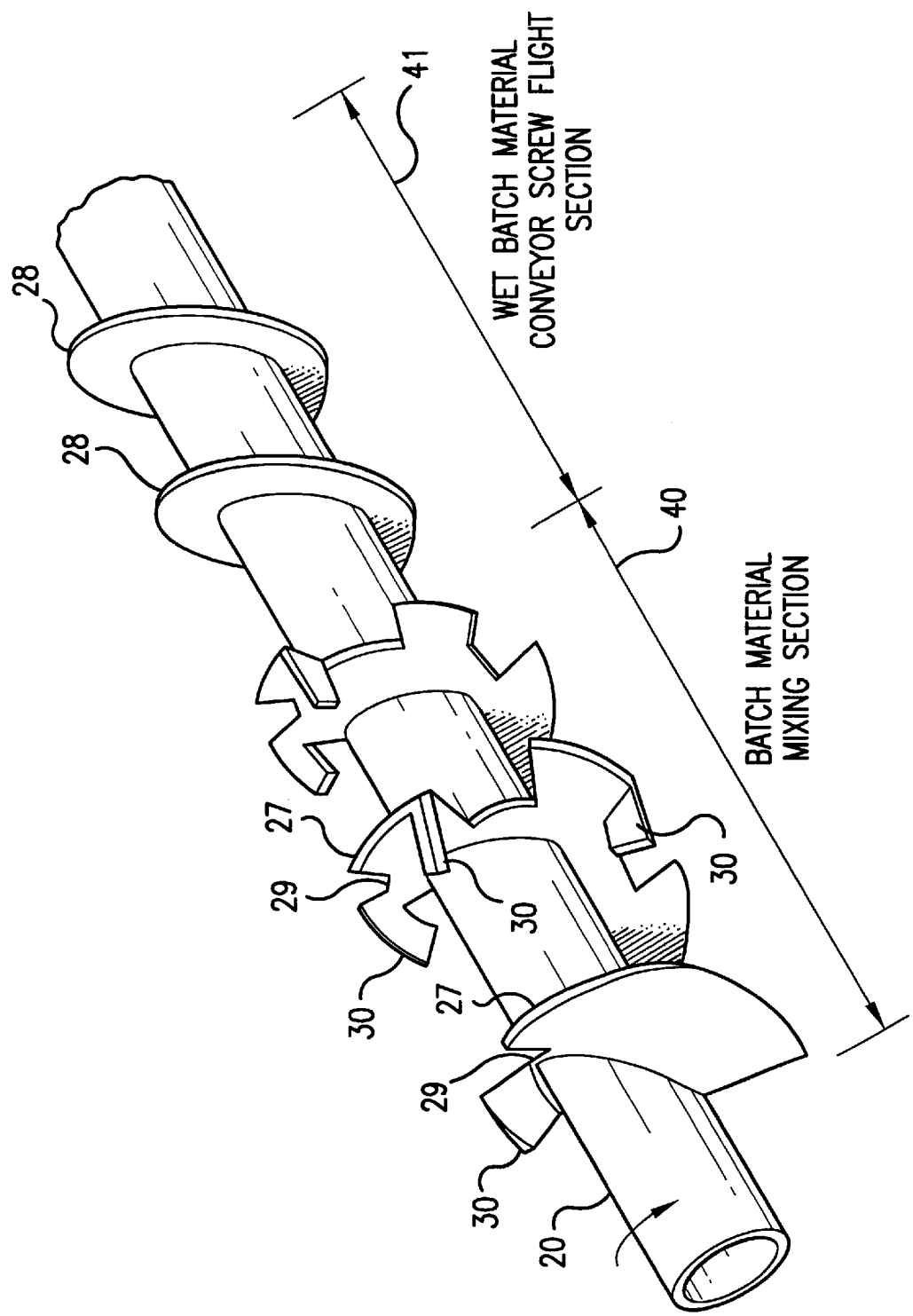
FIG. 2 is a perspective view of a portion of the charger screw of the in-barrel wetting screw charger in accordance with one embodiment of this invention.

In accordance with the embodiment shown in FIG. 1, the in-barrel wetting screw charger 10 comprises a dry batch material supply hopper 11 having a hopper batch material inlet 15 into which dry batch material from a storage hopper (not shown) disposed above the screw charger is introduced and a hopper batch material discharge 14 for discharge of the dry batch material through a housing batch material inlet 13 into charger screw housing 12. It will be apparent to those skilled in the art that other dry batch material supply means for conveying the dry batch material through batch material inlet 13, such as a conveyor belt, may be employed, and such other dry batch material supply means are deemed to be within the scope of the claims hereinbelow. Disposed within charger screw housing 12 is rotatable charger screw shaft 20 comprising at least one batch material mixing section 40, as shown in FIG. 2, disposed immediately beneath hopper batch material outlet 14 which coincides with housing batch material inlet 13. Wetting means, preferably in the form of liquid spray nozzles 22, 23, 24, and 25 are disposed proximate housing batch material inlet 13 and provide a liquid, preferably water, into charger screw housing 12. Liquid spray nozzles 22, 23, 24, and 25 are preferably mounted flush with the inside surface of charger screw housing 12.

The batch material mixing section 40 of rotatable charger screw shaft 20 comprises at least one mixing screw flight section having at least one mixing screw flight 27 which forms at least one notch 29 and which is bent so as to form at least one lifter 30. Batch material mixing section 40 of rotatable charger screw shaft 20, as shown in FIG. 2, is disposed upstream of a wet batch material conveyor screw flight section 41, in accordance with one embodiment of this invention, which is preferred for conveying the wetted batch material from batch material mixing section 40 into the material processing furnace.

In accordance with one embodiment of this invention, batch material mixing section 40 of rotatable charger screw 20 comprises a plurality of outwardly extending paddles 45 secured to rotatable charger screw shaft 20. Although batch material mixing section 40 of rotatable charger screw shaft 20 may utilize only paddles 45 for mixing of the dry batch material and the liquid, in accordance with a particularly preferred embodiment of this invention, batch material mixing section 40 comprises both mixing screw flights 27 and paddles 45, with paddles 45 being disposed upstream of mixing screw flights 27. Where used in combination with mixing screw flights 27, the total paddle surface area of the paddles 45 per unit length of rotatable charger screw shaft 20 should be equal to the total flight surface area of of the mixing screw flights 27 of batch material mixing section 40 per corresponding unit of length of the rotatable charger screw shaft 20 to insure smooth mixing and conveyance of the wetted batch material into the material processing furnace. To further promote conveyance of the wetted batch material into the material processing furnace, rotatable charger screw shaft 20 further comprises wet batch material conveyor screw flight section 41 disposed downstream of batch material mixing section 40 and comprising at least one conveyor screw flight 28.

For rotation of rotatable charger screw shaft 20 within charger screw housing 12, drive unit 33, shown in FIG. 1, is operably connected to rotatable charger screw shaft 20.

Figure 3:
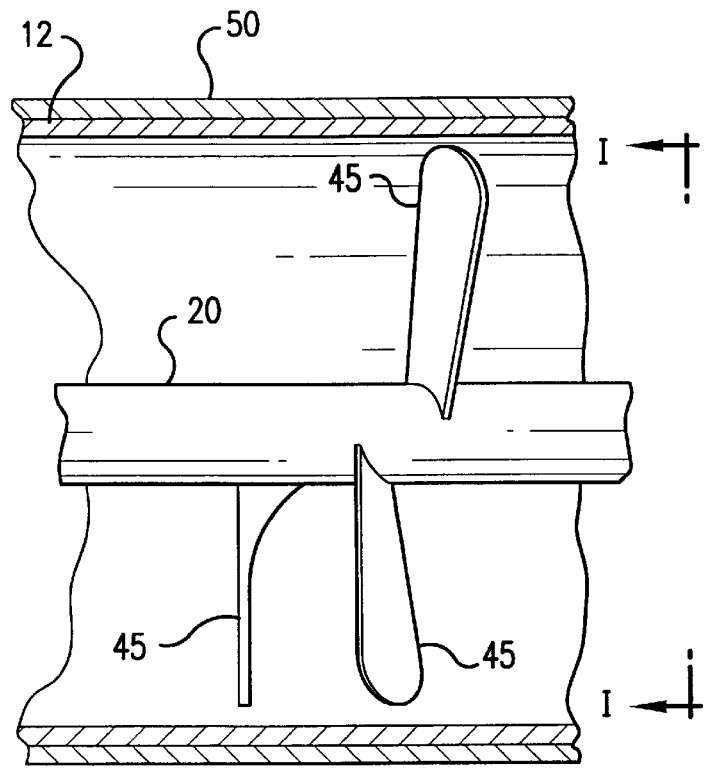
FIG. 3 is a side view of a batch material mixing section of a charger screw in accordance with one embodiment of this invention.
Figure 4:
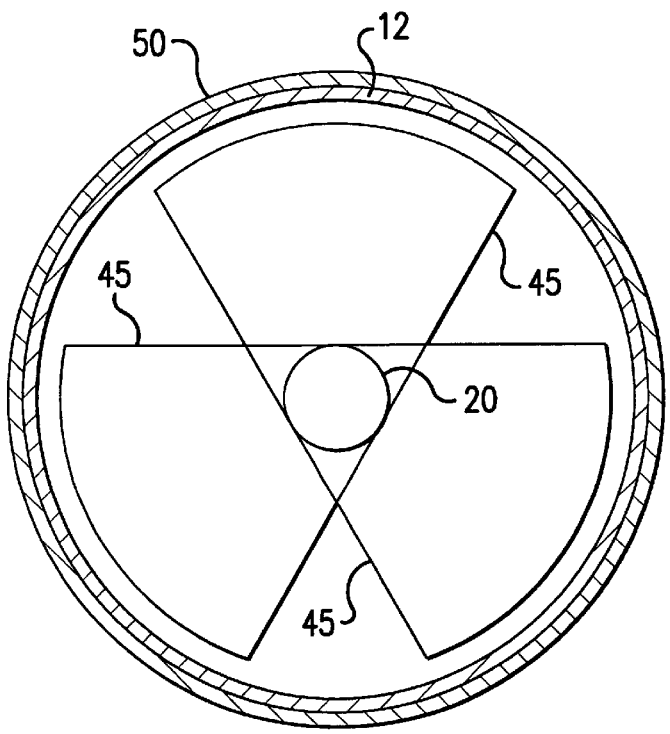
FIG. 4 is a view of the batch material mixing section of the charger screw shown in FIG. 3 along the line IV—IV.

Because of the proximity of the wet batch material charging apparatus of this invention to the material processing furnace, which furnace is, in the case of glass melting, operated at temperatures in excess of 2800° F., it may be necessary to cool the apparatus to promote longevity. In accordance with one preferred embodiment of this invention as shown in FIGS. 3 and 4, at least a portion of the charger screw housing 12 is covered by water cooling jacket 50.

To promote mixing of the liquid and dry batch material in a desirably short length of rotatable charger screw shaft 20, the wet batch material charging apparatus of this invention further comprises flow control means for independently controlling the liquid flow rate and liquid flow duration based upon the batch material charging speed and rotation of rotatable charger screw shaft 20. More particularly, the flow control means enable the introduction of the liquid for wetting the dry batch material into the charger screw housing 12 synchronous with the rotation of rotatable charger screw shaft 20.

Figure 5:
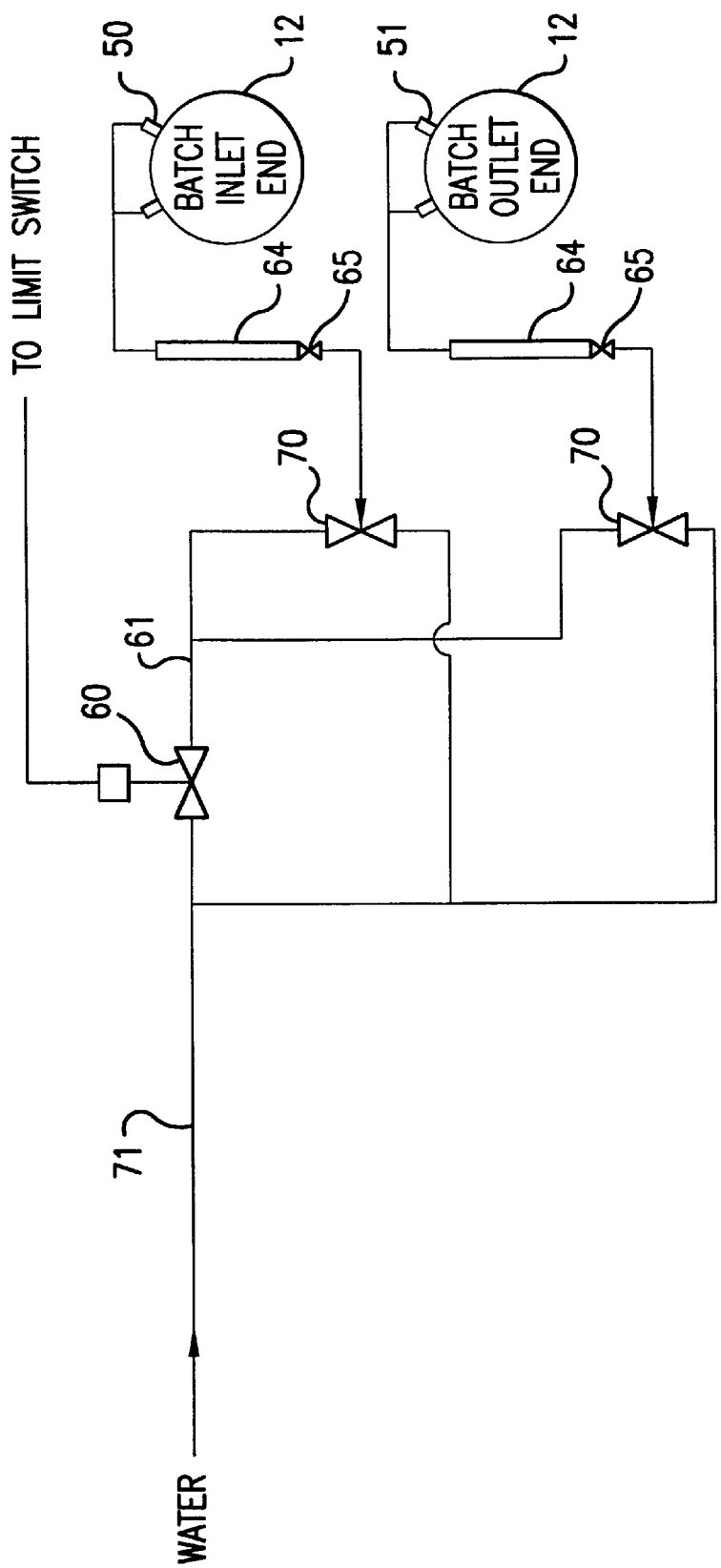
FIG. 5 is a schematic diagram of a flow control system for introducing a liquid into the charger screw housing in accordance with this invention.
Figure 6:
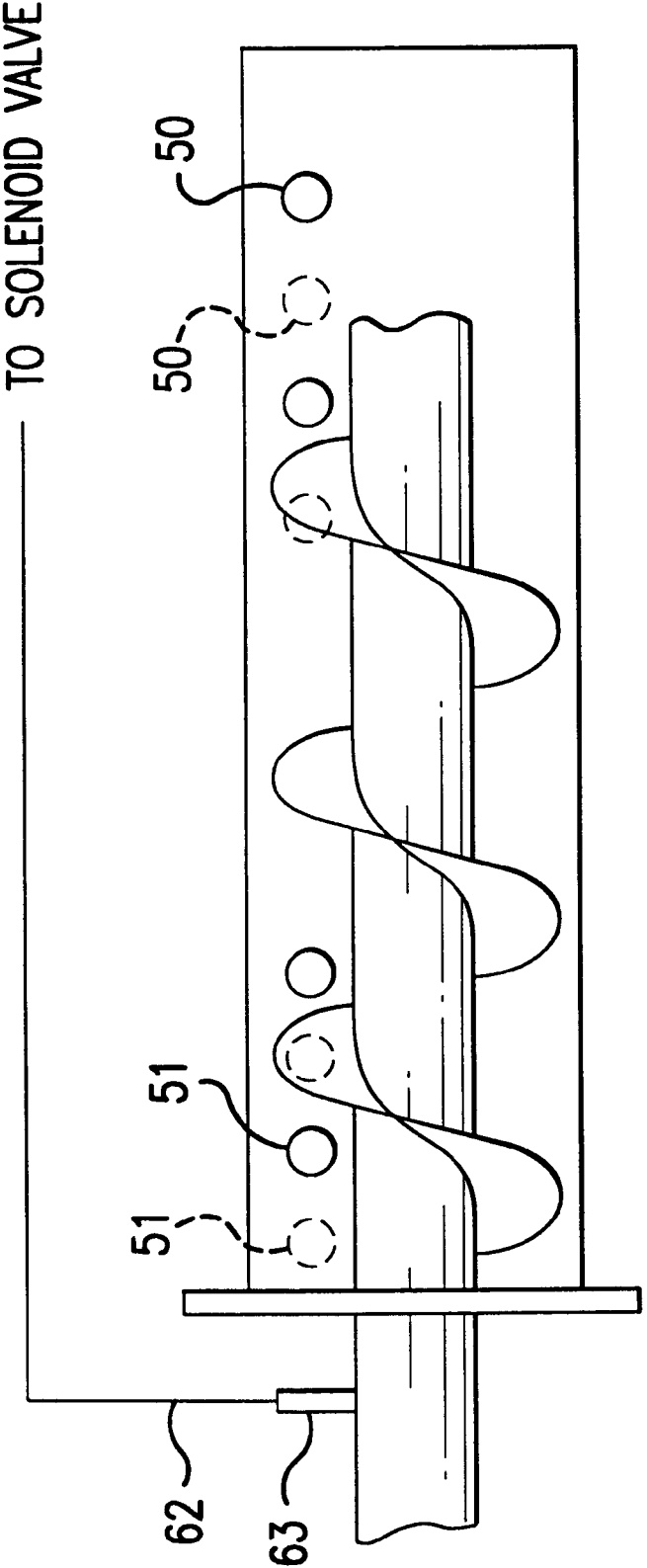
FIG. 6 is a schematic diagram showing placement of the liquid spray nozzles as well as means for triggering the introduction of liquid into the charger screw housing in accordance with one embodiment of this invention.

One embodiment of such flow control means in the form of a liquid injection system is schematically shown in FIGS. 5 and 6. This liquid injection system is designed to provide a wide range of liquid injection options to the operator. The liquid flow can be controlled by the speed of the charger to provide accurate proportioning of the liquid to batch ratio. At the same time, the liquid flow rate and the liquid flow duration for each revolution of rotatable charger screw shaft 20 can be adjusted independently to provide optimum moisture for batch dust control without unnecessarily over wetting the batch material.

As shown in FIG. 6, a plurality of liquid spray nozzles 50, 51 are positioned along the length of charger screw housing 12 between the batch material inlet 13 and the batch material outlet. As shown in FIG. 6, the liquid spray nozzles 50 disposed along one side of the length of charger screw housing 12 are preferably offset with respect to the liquid spray nozzles 51 disposed along the opposite side of the length of charger screw housing 12, allowing the liquid to be injected further downstream of the batch material supply inlet or hopper 11 if batch set-up is a concern. The extent of the offset is dependent upon screw design such as the flight pitch and diameter and the available liquid injection location on the charger screw housing 12 with respect to the circumference of the screw flight.

As previously stated, in accordance with the method of this invention, the liquid injection system is timed to inject the liquid into the charger screw housing 12 immediately after the screw flight passes the liquid spray nozzle. This can be accomplished by the flow control system shown in FIG. 5, which flow control system comprises an automatic on-off flow control valve 60 disposed within the liquid supply conduit 61 through which liquid is supplied to liquid spray nozzle 50. By the term "on-off flow control valve," we mean a valve which, by its operation, pulses (turns on and off) the liquid to the liquid spray nozzle 50. The on-off flow control valve is typically a solenoid valve. A limit switch 62, which is actuated by a cam 63 attached to rotatable charger screw shaft 20 is operably connected to the on-off flow control valve 60 whereby the solenoid is triggered as the screw flight passes the liquid spray nozzle. That is, at the point in time when the screw flight passes the liquid spray nozzles, the cam 63 is aligned on the rotatable charger screw shaft 20 so as to actuate the limit switch which, in turn, triggers the solenoid to open and then close the on-off flow control valve. To control the liquid flow rate, a flow meter 64 comprising a rate flow control valve 65 is provided in the liquid supply conduit 61 between on-off flow control valve 60 and the liquid spray nozzles 50, 51. For those occasions where a pulsed liquid flow is not desired, the liquid injection system of this invention further comprises three-way flow control valve 70 disposed in the liquid supply conduit 61 downstream of the on-off flow control valve 60 having one liquid input in fluid communication with the liquid outlet of the on-off flow control valve 60 and a second liquid input in fluid communication with a continuous liquid supply conduit 71.

It will be apparent that the liquid flow rate to the liquid spray nozzles can be adjusted in several ways and the flow control can be either manual or automatic. By way of example, as shown in FIG. 5, two pairs of liquid spray nozzles 50, 51 are controlled, one pair 50 being disposed proximate the batch material inlet 13 and the other pair 51 being disposed downstream thereof. Associated with each pair of liquid spray nozzles 50, 51 are a flow control valve with a float-type flow meter and a solenoid by-pass valve. In manual operation, the solenoid by-pass valve for the selected pair of liquid spray nozzles is set to a continuous flow condition and the flow control valve on the flow meter is adjusted to the desired flow rate. In automatic operation, the solenoid by-pass valve is set to a pulse flow condition and the flow control valve on the flow meter is adjusted to the desired flow rate. The liquid flow is then pulsed by the solenoid valve in proportion to the charger screw shaft speed. The duration of each pulse cycle can be adjusted by means of a time delay in the control system.

The preferred liquid injection combination of liquid flow rate to the upstream liquid spray nozzles 50 and the downstream liquid spray nozzles 51 is influenced by the batch material and liquid quality. In most instances, the majority of the liquid will be introduced into the charger screw housing through upstream liquid spray nozzles proximate the batch material inlet 13. However, for batch material that sets-up quickly, the majority of the liquid will be introduced into the charger screw housing through liquid spray nozzles 51 which are closer to the batch material outlet.

Utilizing the wet batch material charging apparatus of this invention, the method for charging wet batch material into a material processing furnace in accordance with this invention comprises the steps of introducing a dry batch material into the charger screw housing in which the rotatable charger screw comprising at least one screw flight is disposed, introducing a pulsing stream of a liquid into the charger screw housing through a liquid spray nozzle immediately after the at least one screw flight has passed by the liquid spray nozzle, producing a wet batch material; and discharging the wet batch material into the material processing furnace. The primary liquid injected into the charger screw housing in accordance with this invention is water. However, other liquids including chemical additives such as surfactants may also be mixed into the dry batch material.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A wet batch material charging apparatus comprising:
    a charger screw housing having a batch material inlet and a batch material outlet;
    a dry batch material supply means adapted to deliver a dry batch material through said batch material inlet;
    a rotatable charger screw shaft comprising at least one screw flight disposed within said charger screw housing and adapted to convey said batch material from said batch material inlet to said batch material outlet; and
    wetting means for intermittently introducing at least one liquid into said charger screw housing, said wetting means comprising flow control means for independently controlling a liquid flow rate and a liquid flow duration timed to introduce said at least one liquid only immediately after passage of said at least one screw flight past said wetting means.

2. A wet batch material charging apparatus in accordance with claim 1, wherein said wetting means comprises at least one liquid spray nozzle positioned to introduce said at least one liquid into said charger screw housing and operatively connected to said flow control means.

3. A wet batch material charging apparatus in accordance with claim 2, wherein said flow control means comprises a liquid supply conduit connected to said at least one liquid spray nozzle and an automatic on-off flow control valve disposed within said liquid supply conduit, said automatic on-off flow control valve operable between a fully open position and a fully closed position based upon rotation of said rotatable charger screw shaft.

4. A wet batch material charging apparatus in accordance with claim 1, wherein said wetting means comprises a plurality of liquid spray nozzles positioned at intervals along a length of said charger screw housing to introduce said liquid into said charger screw housing and operably connected to said flow control means, said flow control means comprising individual flow control means for controlling liquid flow through each of said liquid spray nozzles.

5. A wet batch material charging apparatus in accordance with claim 4, wherein said individual flow control means comprises a liquid supply conduit connected to each of said liquid spray nozzles and an automatic on-off flow control valve disposed within each of said liquid supply conduits.

6. A wet batch material charging apparatus in accordance with claim 3, wherein said flow control means further comprises liquid introduction means for introducing said liquid through said at least one liquid spray nozzle into said charger screw housing after said at least one screw flight passes said at least one liquid spray nozzle.

7. A wet batch material charging apparatus in accordance with claim 6, wherein said liquid introduction means comprises a limit switch operably connected to said automatic on-off flow control valve and a cam attached to said rotatable charger screw shaft and operably connected to said limit switch whereby said cam actuates said limit switch which triggers said automatic on-off flow control valve after said at least one screw flight passes said at least one liquid spray nozzle.

8. A wet batch material charging apparatus in accordance with claim 1, wherein said at least one screw flight forms at least one notch and is bent so as to form at least one lifter.

9. A wet batch material charging apparatus in accordance with claim 1 further comprising a plurality of outwardly extending paddles secured to said rotatable charger screw shaft upstream of said at least one screw flight.

10. A wet batch material charging apparatus in accordance with claim 9, wherein a total paddle surface area of said plurality of paddles per unit of length of said rotatable charger screw shaft is substantially equal to a total flight surface area of said at least one screw flight per said unit of length of said rotatable charger screw shaft.

11. A wet batch material charging apparatus in accordance with claim 1 further comprising drive means for rotating said rotatable charger screw shaft operably connected to said rotatable charger screw shaft.

12. A wet batch material charging apparatus in accordance with claim 1 further comprising a liquid cooling jacket covering at least a portion of said charger screw housing proximate said batch material outlet.

13. A wet batch material charging apparatus in accordance with claim 1, wherein said charger screw housing is an elongated hollow cylinder.

* * * * *